(12) United States Patent
Prohaska

(10) Patent No.: US 7,281,723 B2
(45) Date of Patent: *Oct. 16, 2007

(54) SPRAYER STRUT SUSPENSION

(75) Inventor: James B. Prohaska, Prior Lake, MN (US)

(73) Assignee: Miller-St. Nazianz, Inc., St. Nazianz, WI (US)

( * ) Notice: Subject to any disclaimer, the term of this patent is extended or adjusted under 35 U.S.C. 154(b) by 246 days.

This patent is subject to a terminal disclaimer.

(21) Appl. No.: 11/225,339

(22) Filed: Sep. 13, 2005

(65) Prior Publication Data

US 2006/0049598 A1  Mar. 9, 2006

Related U.S. Application Data

(63) Continuation-in-part of application No. 11/067,233, filed on Feb. 25, 2005.

(60) Provisional application No. 60/598,628, filed on Aug. 4, 2004.

(51) Int. Cl.
*B60G 3/01* (2006.01)

(52) U.S. Cl. .................. 280/124.127; 280/93.512; 280/124.157; 180/209

(58) Field of Classification Search ......... 280/124.133, 280/124.134, 124.157, 93.511, 93.512, 124.125, 280/124.145, 124.127; 180/209, 900, 21, 180/213, 253
See application file for complete search history.

(56) References Cited

U.S. PATENT DOCUMENTS

| | | | | | |
|---|---|---|---|---|---|
| 1,302,489 | A | * | 4/1919 | Hollis | 280/638 |
| 2,508,057 | A | * | 5/1950 | Bishop | 244/50 |
| 2,749,137 | A | * | 6/1956 | Thomsen et al. | 280/43.2 |
| 2,750,199 | A | * | 6/1956 | Hart | 280/638 |
| 2,818,930 | A | * | 1/1958 | Kucera | 180/210 |
| 2,934,157 | A | * | 4/1960 | Harp | 180/24.08 |
| 3,044,762 | A | * | 7/1962 | Stengelin | 267/64.23 |
| 3,341,220 | A | * | 9/1967 | Kress | 296/35.1 |
| 3,565,455 | A | * | 2/1971 | Kostas | 280/124.127 |
| 3,741,581 | A | * | 6/1973 | Patrin | 280/86.758 |
| 4,159,749 | A | * | 7/1979 | Boushek, Jr. | 180/308 |
| 5,039,129 | A | * | 8/1991 | Balmer | 180/308 |
| 5,174,415 | A | * | 12/1992 | Neagle et al. | 187/234 |
| 5,597,172 | A | * | 1/1997 | Maiwald et al. | 280/124.153 |
| 5,628,377 | A | * | 5/1997 | Le Gloan | 180/21 |
| 6,371,237 | B1 | * | 4/2002 | Schaffer | 180/253 |
| 6,406,043 | B1 | * | 6/2002 | Balmer | 280/124.1 |
| 6,435,766 | B1 | * | 8/2002 | Titford | 404/75 |
| 6,443,687 | B1 | * | 9/2002 | Kaiser | 414/685 |
| 6,454,294 | B1 | * | 9/2002 | Bittner et al. | 280/677 |
| 6,460,643 | B1 | * | 10/2002 | Degelman | 180/89.12 |

(Continued)

*Primary Examiner*—Paul N. Dickson
*Assistant Examiner*—Barry Gooden, Jr.
(74) *Attorney, Agent, or Firm*—Whyte Hirschboeck Dudek SC

(57) ABSTRACT

A chassis suspension for agricultural equipment, the chassis suspension comprising: an axle having a substantially upright journal adapted for upright axial constraint of an inner journal therein; an inner journal extending into the upright journal, the inner journal having a lower end, wherein the inner journal is adapted to constrain axial movement of a strut rod therein; a strut rod extending into the inner journal and having a lower strut rod portion adapted for mounting a ground-engaging drive mechanism and wheel, wherein the lower strut rod portion has an upper end; and, a spring constrained between the lower end of the inner journal and the upper end of the lower strut rod portion.

13 Claims, 2 Drawing Sheets

U.S. PATENT DOCUMENTS 6,491,306 B2 * 12/2002 Schaffer .................. 280/5.502
6,997,467 B2 *  2/2006 Dean ..................... 280/93.512
7,140,625 B2 * 11/2006 Dean .................. 280/124.146
7,168,717 B2 *  1/2007 Wubben et al. ....... 280/124.127
2002/0053795 A1 *  5/2002 Schaffer .................... 280/830
2006/0170176 A1 *  8/2006 Wubben et al. ....... 280/124.127

* cited by examiner

SPRAYER STRUT SUSPENSION

CROSS-REFERENCE TO RELATED APPLICATIONS

This application is a Continuation-In-Part of co-pending U.S. application Ser. No. 11/067,233 filed Feb. 25, 2005, which claims priority to U.S. Provisional Application Ser. No. 60/598,628 filed on Aug. 4, 2004, abandoned.

BACKGROUND OF THE INVENTION

This invention relates generally to chassis suspension for agricultural equipment, and more specifically to methods and apparatus for a spring-cushioned suspension system for a sprayer.

High clearance agricultural vehicles have been known for years. They are particularly useful in spraying row crops. In this instance, these are typically designed for use with maturing corn of four or five feet in height and in order to avoid damage to the crop, the vehicles have a general clearance at least equal to the height of the rows of crops, (hence the vehicles are relatively tall pieces of equipment). These vehicles generally have at least two drive wheels the width of which allows the vehicle to pass between two different crop rows. The vehicles are also equipped with a boom which extends outwardly from both sides of the vehicle to spray relatively large crop areas at a time.

In one manner of application, sprays are applied to the crops during the tilling stage when the crops are quite small and a conventional ground-type crop sprayer could traverse the field without causing damage to the small plants. However, conventional ground supported crop sprayers are usually not suitable during the latter stages of growth. For example, during the stem extension stage, the likelihood of damage to the standing crops increases if the spray is applied by a ground traversing conventional crop sprayer.

Conventional crop sprayers are even more unsuitable for applying agricultural sprays during the heading and ripening stage of the crop. However, in order to obtain a good yield, it is often necessary to apply spray, for example, a fungicide, during the these stages especially to crops such as, wheat, barley, and the like. Spraying at these latter stages of growth has been typically done by aerial spraying in order to avoid damage to the standing crop. The effectiveness of aerial spraying is dependent in large part upon the weather conditions, and even then, the application of the spray is not as effective as ground spraying if damage to the standing crop can be avoided. Further, the spray must be concentrated when applied by crop aerial dusting because of the limitations of the capacity of the aerial sprayer.

Because spray vehicles operate over rough ground and in tall mature crops, various devices are used to help cushion the vehicle, operator, and boom from the effects of these rough surfaces. Most of these devices suffer from one or more disadvantages such as limited cushioning or bulkiness leading to interference with spraying the crop. A cushioned wheel arrangement, such as the front wheel suspension shown in U.S. Pat. No. 5,066,030, is available for relatively small sprayers with a single steerable wheel. However, such a suspension is not suitable for most larger sprayers or sprayers having two or more steerable wheels. Some available self-propelled sprayers have strut suspensions such as the one disclosed in U.S. Pat. No. 5,597,172. Strut shaft type suspensions may not have the ability to provide all of the traction necessary to move freely about rough terrain. Furthermore, the strut shafts may bend under rough terrain conditions thus making the vehicle less durable.

Sprayer suspensions with strut shafts may also include steel suspension springs immersed in oil. However, these often leak, and require supports with relatively large diameters both above and below the axle which interfere with the crops. Therefore, providing adequate cushioning without adversely affecting the crops continues to be a problem. Further, commercial systems with spring suspension systems have added cab roll on sloping terrain which results from compression of the springs.

U.S. Pat. No. 5,353,988 shows another suspension system. One of the drawbacks of this system is that the swing arms pivot point is high (for ground clearance) and the wheels are low. This configuration can cause problems when the vehicle hits a bump because the wheels move out as much as they do up. Thus, every bump the vehicle hits tends to shove the wheel into the crop which can damage the crop. Moreover, as the vehicle's load gets heavier or lighter, it changes its wheel track, so that when it's fully loaded it may be running over the outside rows and when it is empty it may be running over the inside rows.

Given the above-described deficiencies of existing high clearance vehicles, the industry has a continuing interest in designing such a vehicle with an improved suspension system that minimizes crop interference and bump steer problems, a smoother ride, improved boom visibility and suspension, an improved cooling system, an improved tank design, a wheel configuration which improves traction and minimizes damage to crops, and ready access to operating parts for ease in service and repair.

The above-referenced U.S. patents disclose embodiments that were at least in-part satisfactory for the purposes for which they were intended. The disclosures of all the above-referenced prior United States patent, in their entireties are hereby expressly incorporated by reference into the present application.

BRIEF SUMMARY OF THE INVENTION

A chassis suspension comprising: an axle having a substantially upright journal adapted for upright axial constraint of an inner journal therein; an inner journal extending into the upright journal, the inner journal having a lower end, wherein the inner journal is adapted to constrain axial movement of a strut rod therein; a strut rod extending into the inner journal and having a lower strut rod portion adapted for mounting a ground-engaging drive mechanism and wheel, wherein the lower strut rod portion has an upper end; and, a spring constrained between the lower end of the inner journal and the upper end of the lower strut rod portion.

BRIEF DESCRIPTION OF THE DRAWINGS

Preferred embodiments of the invention are described below with reference to the following accompanying drawings, which are for illustrative purposes only. Throughout the following views, reference numerals will be used in the drawings, and the same reference numerals will be used throughout the several views and in the description to indicate same or like parts or steps.

DETAILED DESCRIPTION OF THE INVENTION

In the following detailed description, references made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention.

This invention is suitable for use in any appropriate strut suspension, particularly on high-clearance agricultural vehicles such as those disclosed in U.S. Pat. No. 6,454,294, incorporated herein by reference. An example of a suitable application is use as the suspension for a high-clearance sprayer.

Figure 1:
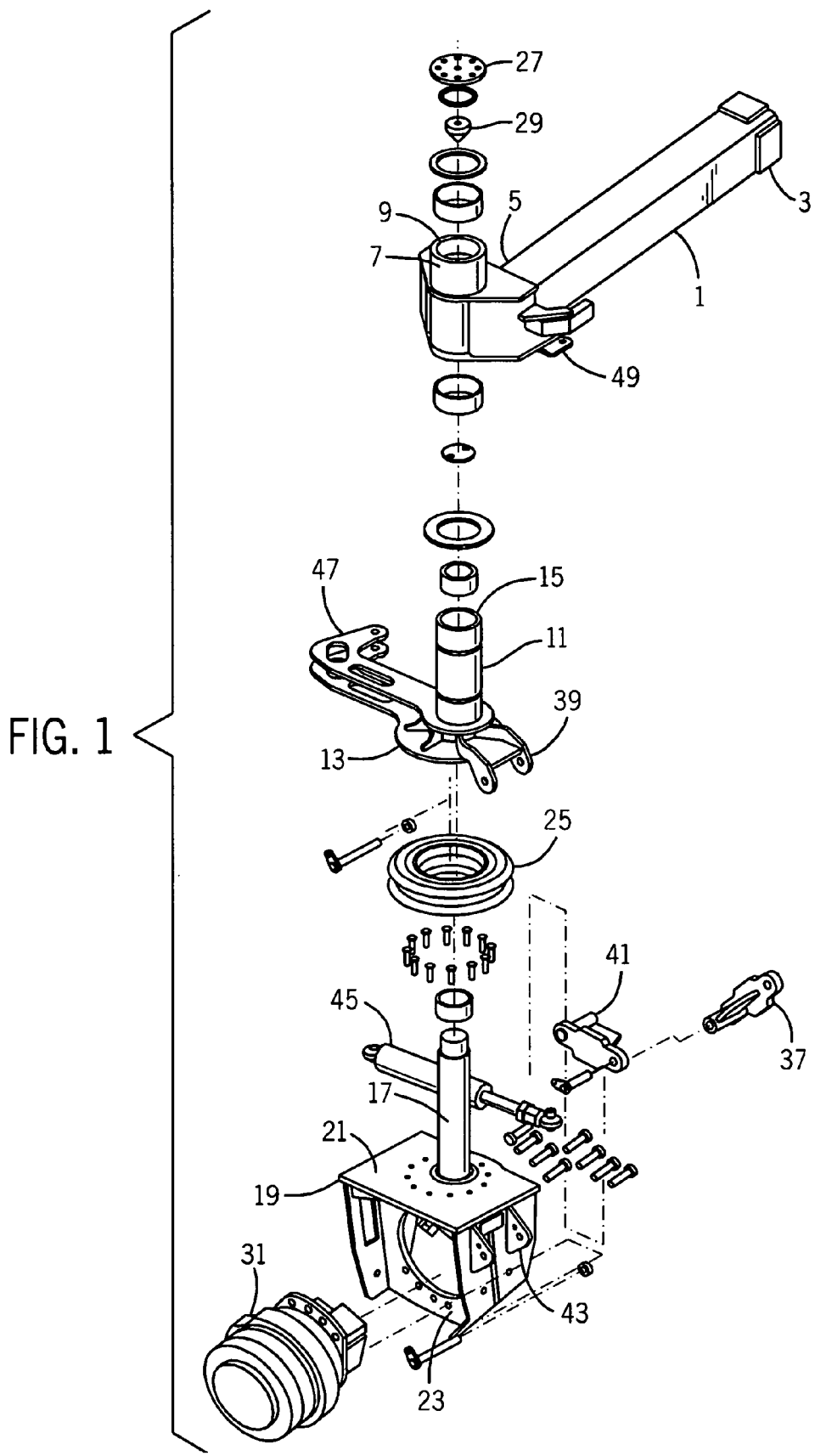
FIG. 1 shows an expanded view of a suspension strut assembly of the current invention.
Figure 2:
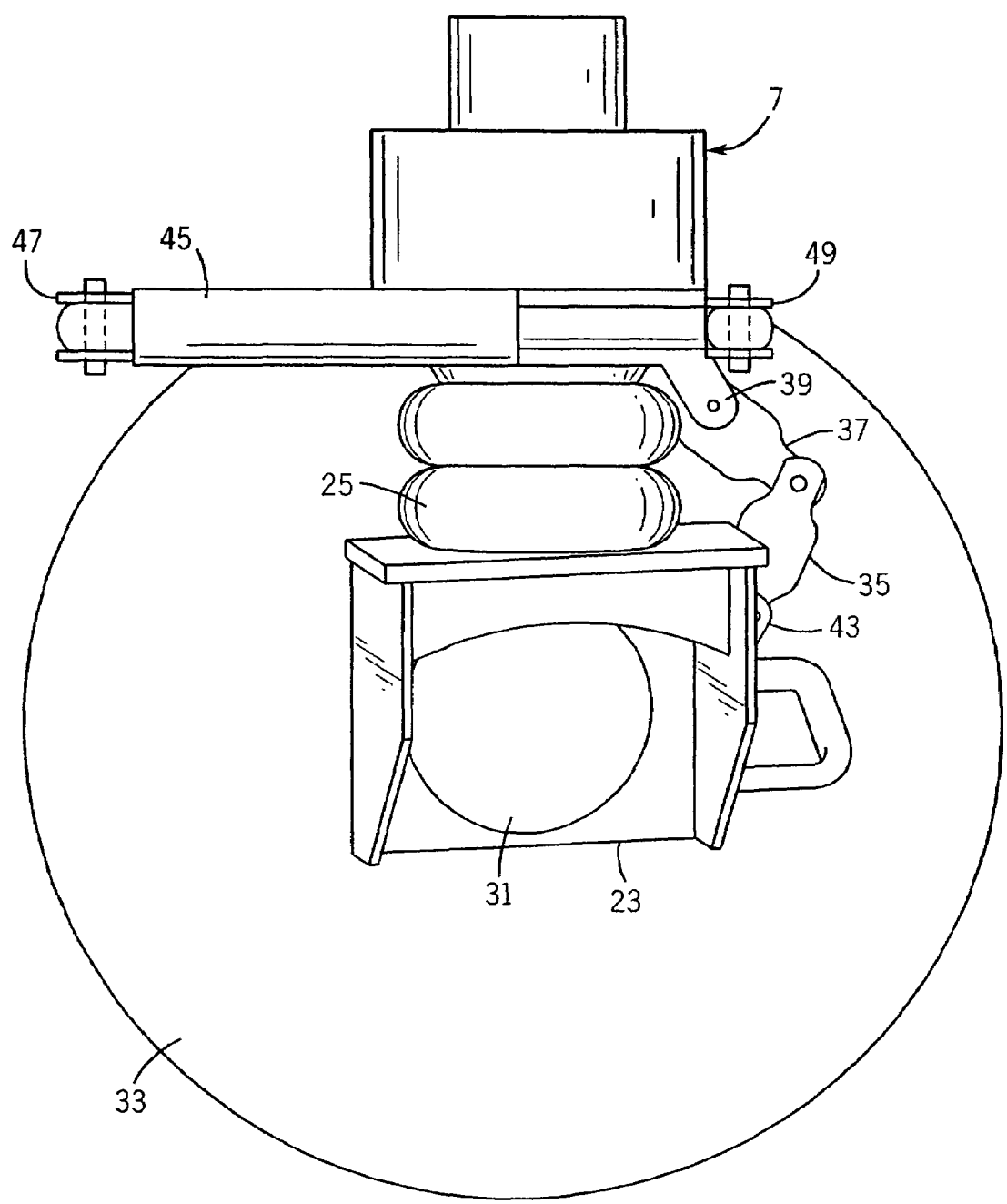
FIG. 2 shows a side view of the assembled strut assembly of FIG. 1 in position on a wheel of a sprayer.

A preferred embodiment of a typical strut assembly of the invention is shown in FIGS. 1 and 2. Axle 1 attaches to the chassis or frame of the sprayer (not shown). In a typical installation, the proximate end 3 of axle 1 slides into the sprayer frame. The distal end 5 of axle 1 connects to a substantially upright journal 7. A circular opening 9 extends lengthwise through upright journal 7. An inner journal 11 fits through the circular opening 9 of upright journal 7 and rotatably engages upright journal 7 to allow for rotational steering motion. Upright journal 7 is adapted to constrain axial movement of inner journal 11.

Inner journal 11 has a base plate 13 located at the bottom of the journal. An opening 15 in base plate 13 extends lengthwise through inner journal 11. A strut 17 passes through opening 15 such that the strut 17 can both slide axially and rotate within opening 15.

Strut 17 is affixed to a mounting assembly 19. Mounting assembly 19 comprises a horizontal mounting plate 21 and a vertical mounting plate 23. A spring 25 is attached to both base plate 13 and horizontal mounting plate 21 such that strut 17 passes through spring 25 and into opening 15.

Preferably, spring 25 is an airbag comprising a flexible membrane that typically has a pillow or bellows shape. Such airbag springs are also commonly known as air springs. Pressurized air in the airbag provides a spring-like dampening effect (also known as "shock absorption") to vertical movement of mounting assembly 19 relative to upright journal 7. The degree of shock absorption can be adjusted as desired by changing the air pressure in the airbag. When spring 25 is an air bag, inner journal 11 has an airtight cap 27 covering opening 15 to prevent escape of the pressurized air within the airbag. The air pressure trapped in the bore of the inner journal 11 by airtight cap 27 exerts a downward force on strut 17, thereby incorporating the cross-section of the strut rod within the effective diameter of the airbag spring 25. A bumper 29 is attached to the bottom of airtight cap 27 to prevent the top of strut 17 from striking cap 27.

Air spring suspension systems, in which bellows-shaped air spring suspension elements take up the vertical load from the vehicle chassis and load, are well-known in the art. The air springs in such systems typically communicate with a pneumatic air control system by means of which one may, on the one hand, control the pressure in the air springs in response to the load and to non-uniformities of the load distribution. An example of a suitable air spring system is disclosed in U.S. Pat. No. 6,454,294 (particularly in FIG. 7A of that patent), in which a leveling control circuit is employed to compensate for weigh/load shift and to maintain a constant frame elevation relative to ground level. The softness of the ride, that is, the amount of travel that cushioning element has, depends on the air pressure inside the bag. An airbag valve is provided to control pressure in that when pressure drops the valve opens up and pumps the bag back up to a consistent height. Added weight when fully loaded increases pressure giving an unregulated system a really stiff suspension and a really rough ride. However, when air is let out of the regulated airbag, the suspension drops down so it's nice and spongy.

Returning again to FIGS. 1 and 2, a drive motor 31 is attached to vertical mounting plate 23 of mounting assembly 19. The drive motor 31 engages with a wheel 33 to provide forward and rearward motion to the sprayer. Typically, drive motor 31 is a hydraulic wheel motor such as is well-known in the art. The hydraulic wheel motors are connected to a conventional source of pressurized hydraulic fluid (not shown) on the sprayer.

Hydraulic drive motors have been used on various automotive and non-automotive vehicles for years, such as those disclosed in U.S. Pat. Nos. 2,418,123, 3,179,016, 3,280,934, 3,584,698 and 3,612,205. Hydraulic wheel motors have achieved a fair degree of commercial success in farm and off road vehicles, as shown in U.S. Pat. No. 3,584,698. These hydraulic wheel motors are provided with a rotary member and a stationary member having a plurality of cavities for pumping hydraulic fluid which periodically varies in displacement as the stationary and the rotary member move relative to one another. Hydraulic fluid from an engine driven pump is supplied to the hydraulic wheel motors for propelling the vehicle.

The relative rotational positioning of the inner journal 11 and the mounting assembly 19 is fixed by means of a scissors joint 35. Scissors joint 35 comprises an upper arm 37 pivotally attached to a lower arm 41. Upper arm 37 is pivotally attached to a mounting bracket 39 on inner journal 11. Lower arm 41 is pivotally attached to a mounting bracket 43 on the mounting assembly 23. The scissors joint 35 permits vertical movement, but prevents rotational movement, of the inner journal 11 with respect to the mounting assembly 23.

Steering means may also be attached to the strut assemblies. A hydraulic piston 45 is connected to a conventional source of pressurized hydraulic fluid. One end of piston 45 is attached to a mounting bracket 47 on inner journal 11 while the other end of piston 45 is attached to a mounting bracket 49 located on outer journal 7. Extension or retraction of piston 45 changes the relative rotational positioning of the outer journal 7 and the inner journal 11 (and, by attachment, mounting assembly 23 and wheel 33). The steering mechanisms need not be attached to all wheel struts and is typically attached to just the front two wheel struts.

Because row spacings in row crop situations can vary from field to field, the wheel track of the spray vehicle must be adjusted accordingly. Linkage adjustments may be time-consuming and inconvenient. For example, when spraying solid seeded crops such as wheat or barley, sprayers must drive directly over the plants which may cause damage. An adjustable linkage for a sprayer is shown in U.S. Pat. No. 5,464,243, incorporated herein by reference. Other vehicles can manually widen one set of wheels independent from the other to reduce the potentially damaging track of their wheel configurations. However, manually adjusting the wheel configurations can take a considerable amount of time and thus again reduce the vehicle's productivity.

Steering arrangements for cushioned sprayer wheel assemblies include those with steering arms at the tops of the strut shafts. Such top mounted arm arrangements often have an undesired movement of the steerable wheels over rough ground surfaces, referred to as bump steering, as the steering arms move up and down with the strut shafts.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A chassis suspension comprising:
   an axle having a substantially upright journal adapted for upright axial constraint of an inner journal therein;
   an inner journal extending into the upright journal, the inner journal having a lower end, wherein the inner journal is adapted to constrain axial movement of a strut rod therein;
   a strut rod extending into the inner journal and having a lower strut rod portion adapted for mounting a ground-engaging drive mechanism and wheel, wherein the lower strut rod portion has an upper end;
   a spring constrained between the lower end of the inner journal and the upper end of the lower strut rod portion; and,
   wherein the axle is an adjustable wheel track axle.

2. The suspension of claim 1, wherein the upright journal is further adapted for rotational movement of the inner journal therein.

3. The suspension of claim 1, wherein the inner journal is further adapted for rotational movement of the strut rod therein.

4. The suspension of claim 1, wherein the upright journal is further adapted for rotational movement of the inner journal therein.

5. The suspension of claim 1, wherein the spring comprises an airbag.

6. The suspension of claim 5, wherein the airbag contains pressurized air.

7. The suspension of claim 6 wherein the air pressure is adjustable.

8. The suspension of claim 1, wherein the drive mechanism is a hydraulic drive motor.

9. The suspension of claim 3, wherein relative rotational positioning of the inner journal and the strut rod is fixed by means of a scissors joint.

10. The suspension of claim 1 further comprising steering means.

11. The suspension of claim 10 wherein the steering means comprise at least one hydraulic piston.

12. A sprayer comprising at least one chassis suspension of claim 1.

13. The sprayer of claim 12 wherein the sprayer is a high clearance vehicle.

* * * * *